Patented July 13, 1954

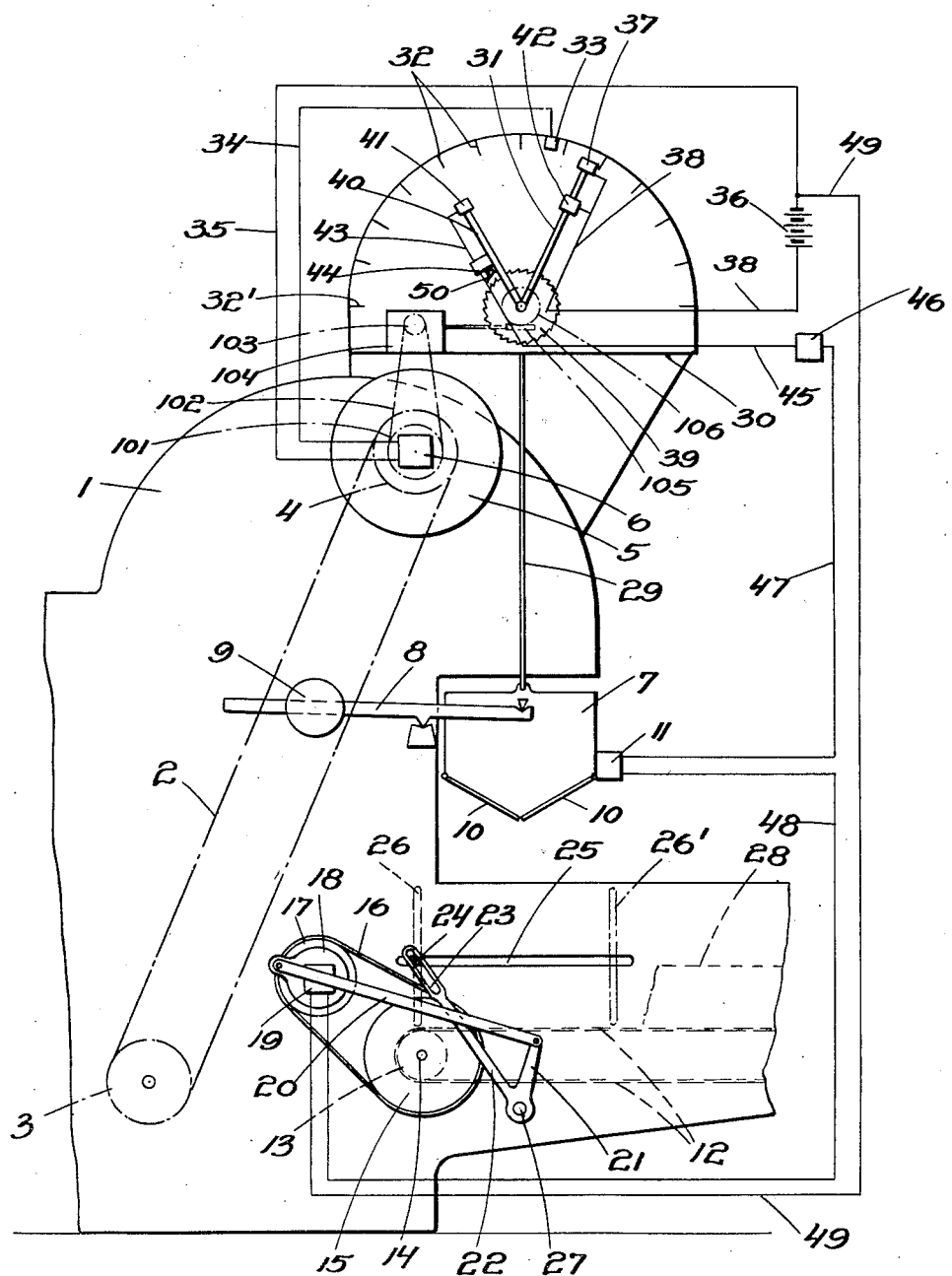

2,683,289

UNITED STATES PATENT OFFICE 2,683,289

METHOD AND A DEVICE FOR COMPENSATING WEIGHING FAULTS IN FEEDERS FOR CARDING MACHINES

Olle Evald Sandelin, Malmö, Sweden

Application December 15, 1948, Serial No. 65,352

Claims priority, application Sweden January 23, 1948

6 Claims. (Cl. 19—69)

Certain kinds of carding materials are usually fed to the carding machine proper with the aid of a feeding apparatus weighing out successive batches of carding material in a scale which automatically empties the weighed-out batches in succession on to a feeding cloth conveying the material to the carding machine and moving at a determined speed in relation to the carding means of the machine, the successive batches from the scale being packed together to a continuous layer on the lattice by a plate reciprocating longitudinally of the lattice. This carding material is not weighed out as exact as necessary by the known feeders, since there constantly occur relatively great weighing faults which may often amount to 10 per cent and more, particularly when these faults are systematic ones of short or long duration. On account of these incorrect weighing operations irregularities naturally occur in the web produced by the carding machine and the said irregularities will be apparent in the spun yarn also. These irregularities involve of course an inferior quality of the finished product and they also greatly disturb the manufacture as breakages of the thread will occur from the carding machine and up to the finished product. Therefore, efforts have been made to improve the weighing out of the carding material, but hitherto these efforts have generally been limited to measures for attaining a more suitable supply of carding material to the scale, a greater sensitivity of the weighing machine and for providing control devices which direct the attention of the workers to great weighing faults, so that they may intervene as soon as possible and remove the cause of the fault. However, by these measures a complete compensation of the weighing faults of the feeding apparatus has by no means been realized. It has also been proposed to reciprocate the plate packing together the batches from the scale on the feeding lattice to a continuous layer, at a speed that varies proportionally to the real amount of carding material weighed out in the scale, but in this manner it is not possible to attain any compensation of series of carding material batches having underweight and overweight.

The principal object of the invention is to provide a method and a device for compensating the weighing faults in such feeders for carding machines in such a way that a complete compensation of the weighing faults is obtained both theoretically and practically by means of a relatively simple device suitable for practical use.

Other objects and advantages of the invention will be apparent from the following description of an embodiment shown diagrammatically in the accompanying drawing as an illustrative example only.

In the drawing part of a feeding apparatus 1 for a wool carding machine (not shown) is illustrated. The feeding apparatus 1 in general is of a known conventional construction and has a feeding lattice 2 passing over two return pulleys 3 and 4 and driven in a known manner (not shown) from the carding machine through a wheel 5 and a clutch 6 mechanically engageable in a known manner and electrically disengageable. The feeding lattice 2 conveys the wool in the known manner from a hopper feeder (not completely shown on the left of the drawing) to a scale 7 suspended from a balance beam 8 which is provided with a counterweight 9 balancing the weight of the scale. The bottom of the scale 7 is in the known manner formed of two doors 10 which can be swung down by the release of a latch 11 electrically, whereas the doors may be closed again mechanically in the conventional manner. When opening the doors 10 of the scale 7 the wool batch weighed out therein is deposited on a feeding cloth 12 passing over a pulley 13 and extending to the carding machine proper (not shown in the drawing). The pulley 13 is driven in a known manner from the carding machine at a speed which is directly proportional to the speed of the carding means of the machine. On the shaft 14 of the pulley 13 there is fixed a pulley 15 driving another pulley 17 by means of a belt 16. The pulley 17 may be interconnected with a crank 18 by means of a single revolution clutch 19 which can be of any known construction and is electrically engageable.

Every time when the single revolution clutch 19 is engaged by an electric impulse, the crank 18 will thus effect one revolution and then remain at rest until the single revolution clutch 19 is again engaged by means of a new impulse. The crank 18 is connected by means of a connecting rod 20 to the one arm 21 of a bell crank lever, the other arm 22 of which is provided with a slot 23 in which a pin 24 slides. The pin 24 is guided in a groove 25 provided in the side wall of the feeding apparatus 1 and parallel to the upper run of the feeding cloth 12, and is attached to a vertical plate 26 extending transversely over the feeding cloth 12. The bell crank lever 21, 22 is attached to a rotatably mounted shaft 27 extending under the feeding cloth 12 to the opposite side of the feeding apparatus, where a corresponding bell crank lever is arranged for operating a pin 24 on the other end of the plate 26, which pin is guided in a corresponding manner in a groove 25. Thus, when the crank 18 is rotated through one revolution, the plate 26 will be reciprocated in a working cycle in the groove 25 from the position shown by means of dotted lines to the position 26' shown by means of dashed and dotted lines and back, a wool batch emptied from the scale 7 on to the feeding cloth 12 being moved to the right by the plate 26 which is travelling faster than the feeding cloth 12 and which packs the said batch together with the continuous wool layer 28 formed by wool batches already weighed out and deposited on the feeding cloth 12.

The scale 7 is connected by means of a wire 29 or the like to a weighing mechanism 30 having a hand 31 travelling over a graduation 32. The weighing mechanism is constructed in such a way that the graduation 32 is linear, i. e. from the zero point 32' the hand 31 makes along the graduation a deflection which is directly proportional to the weight of the wool in the scale 7. On an arbitrary point of the graduation 32 an index 33 may be fixed for determining the desired weight of every wool batch. The index 33 is provided with one or more electric circuit controlling means connected by means of a conductor 34 to the clutch 6 which is besides connected to one pole of an electric power source 36 by means of a conductor 35. The weight controlled means or hand 31 has one or more electric circuit controlling means 37 which are connected to the other pole of the power source 36 by means of a conductor 38. When the hand 31 reaches a position opposite the index 33 during the weighing-out of a wool batch, the circuit controlling means of the index 33 and the circuit controlling means 37 of the hand 31 will close a circuit through the clutch 6 via the conductors 35 and 34, 38, so that the drive connection between the wheel 5 and the feeding lattice 2 is broken, whereby the supply of wool to the scale 7 ceases. After some oscillation the hand 31 will stop in a position of balance corresponding to the real weight of the wool batch in the scale 7, and this position of the hand will often lie out of line with the index 33 (a certain overweight of the wool batch in the scale is indicated in the drawing).

Coaxial with the hand 31 is mounted a ratchet wheel 39 which is constantly rotated at a speed which is directly proportional to the speed of the carding means of the machine and thus to the speed of the feeding cloth 12. In the drawing the drive of the ratchet wheel 39 is shown by way of example as comprising a sprocket 101 secured to the wheel 5 and driving a chain 102 engaging a sprocket 103 on the input shaft of a worm drive 104 the output shaft of which carries a worm 105 engaging a worm wheel 106 which is secured to the ratchet wheel 39. Coaxial with the hand 31 and the ratchet wheel 39 is also mounted a feeler 40 having one or more electric circuit controlling means 41 for cooperation with one or more electric circuit controlling means 42 on the hand 31. The circuit controlling means 42 of the hand is connected to the conductor 38, whereas the circuit controlling means of the feeler 40 is connected by means of a conductor 43 to a solenoid 44 mounted on the feeler and in turn connected by means of a conductor 45 to a time switch 46 which is connected to the latch 11 of the scale 7 by means of a conductor 47. From the latch 11 which may be of any known and suitable construction a conductor 48 leads to the single revolution clutch 19 which is connected by means of a conductor 49 to the same pole of the power source 36 as the conductor 35. On the feeler 40 there is mounted a pawl 50 of such a known construction which, by snapping over a dead center, is able to occupy two positions only, viz. one in which it engages the ratchet wheel 39, and the other, in which it is out of engagement with the said ratchet wheel.

When engaged by the pawl 50 during a weighing operation, the ratchet wheel 39 which is driven at a certain speed will thus slowly rotate the feeler 40 in the same direction and in substantially the same path as the hand 31 which travels towards increasing weight. The feeler 40 reaches the hand 31 when the latter has stopped after the supply of wool to the scale 7 has been cut off in the manner described above. Thereby the circuit controlling means 41 and 42 of the feeler and the hand close a circuit from the one pole of the power source 36 through conductor 38, the circuit controlling means, conductor 43, solenoid 44, conductor 45, time switch 46, conduit 47, latch 11, conduit 48, single revolution clutch 19 and conductor 49 to the other pole of the power source. On account thereof the iron armature of the solenoid 44, connected to the pawl 50, moves the said pawl to the position in which it is out of engagement with the ratchet wheel 39, so that the feeler 40 is swung by the action of a return spring (not shown) back to the zero point 32' of the graduation 32, where a stop (not shown) again swings the pawl 50 into engagement with the ratchet wheel 39, so that the feeler starts a new swinging cycle. At the same time the latch 11 is given a current impulse so that the doors 10 are opened and the wool batch weighed out in the scale 7 is deposited on the feeding cloth 12. Simultaneously therewith the single revolution clutch 19 is given a current impulse so that it is engaged and rotates the crank 18 through one revolution, the plate 26 effecting a working cycle in the manner previously described and incorporating the deposited wool batch with the wool layer 28 on the feeding cloth. At the beginning of the working cycle of the plate 26 the doors 10 of the scale 7 are mechanically closed in a known manner.

When the scale 7 is emptied, the hand 31 naturally swings back to the zero point 32' of the graduation 32, and almost immediately a new weighing operation is started, since the clutch 6 is mechanically engaged in a known manner for taking up the wool supply again to the scale 7 by means of the feeding lattice 2. Immediately at the beginning of the weighing operation the circuit controlling means 41 and 42 of the feeler 40 and of the hand 31 will momentarily interconnect the conductors 38 and 43 and it is therefore necessary to prevent a too early impulse to solenoid 44, latch 11, and clutch 19. This is realized by means of the time switch 46 which in a known manner holds the circuit between the conductors 45 and 47 broken during a certain time after the preceding current impulse. It will readily be seen that by means of the device described it is attained that per unit of length of the feeding cloth 12 the wool layer 28 will always contain the same amount of wool by weight, since the wool layer 28 between two succeeding weighing operations is always moved by the feeding cloth through a distance from the turning point 26' of the plate 26 that is directly proportional to the weight of the following wool batch. The ratchet wheel 39 moves the feeler 40 at a speed directly proportional to the speed of the feeding cloth 12, so that the wool layer 28 will consequently move a greater distance when the hand 31 stops in a position corresponding to a higher weight of the wool batch than when it stops in a position corresponding to a lower weight of wool batch.

The principle of invention consists in bringing the scale to empty its contents on to the feeding cloth at intervals of such a length that the distance through which the feeding cloth is moved during each interval, is directly proportional to the real weight of the wool batch weighed out during the respective interval, and in causing the plate 26 to effect its working cycles in step with the emptyings of the scale, and it will readily be seen by those skilled in the art that the invention may be realized in other ways than that illustrated and described. As regards the device shown it should be pointed out that the circuit controlling means 33, 37, 41, 42 may be constructed in any suitable manner.

What I claim and desire to secure by Letters Patent is:

1. In feeders for carding machines, in which successive batches of carding material are weighed out with errors that vary in relation to the desired weight, in a scale emptying the batches weighed out in succession on to a feeding belt which conveys the carding material to the carding machine proper and travels at a determined speed relative to the speed of the carding machine, the successive batches from the scale being packed together in a continuous layer by means of a plate reciprocating longitudinally of the said feeding belt, a device comprising weight controlled means connected to said scale and movable by said scale along a predetermined path directly proportional to the real amount by weight of carding material in said scale, electric circuit controlling means on said weight controlled means, feeler means, means for driving said feeler means at a speed which is directly proportional to that of the carding machine and thus to that of the feeding belt, in substantially the same path and the same direction as said weight controlled means, electric circuit controlling means on said feeler means, an electrically operable device for emptying said scale, an electrically operable device for effecting operation of said plate packing the carding material together on said feeding belt, an electric power source, and electric circuit means connecting said devices with said circuit controlling means and said power source, said circuit controlling means on said weight controlled means and on said feeler means being adapted, when said weight controlled means and said feeler means meet in their path of motion, to alter the condition of said electric circuit means in order to obtain an impulse causing operation of said electrically operable devices.

2. A feeder for a carding machine comprising a conveyor, means for operating the conveyor at a predetermined speed for conveying material to the carding machine, a material weighing machine having a pan provided with discharge mechanism and positioned above the conveyor to discharge material onto the conveyor, a first element actuated by the weighing machine and moved in a predetermined path through a distance proportional to the weight of material in the pan to a position of rest, a second element movable in a path following that of the first element, means moving the second element at a rate proportional to the speed of the conveyor, and means operable upon the second movable element reaching the first movable element for actuating the discharge mechanism of the pan to discharge material from the pan onto the conveyor.

3. A feeder for a carding machine comprising a conveyor, means for operating the conveyor at a predetermined speed for conveying material to the carding machine, a material weighing machine having a pan provided with discharge mechanism and positioned above the conveyor to discharge material onto the conveyor, a first element actuated by the weighing machine and moved in a predetermined path through a distance proportional to the weight of material in the pan to a position of rest, a second element movable in a path following that of the first element, means for moving the second element at a rate proportional to the speed of the conveyor, electrical contacts carried by said movable elements, an electric actuator for the pan discharge mechanism, and an electric circuit cooperating with said contacts and pan discharge mechanism actuator for energizing said actuator upon engagement of said contacts.

4. A method of feeding carding material to a carding machine comprising moving a conveyor at a predetermined speed to convey carding material to the carding machine, cyclically feeding carding material to a scale pan, terminating the feeding of the material to the pan when an approximate predetermined weight of material has been introduced into the pan, discharging the weighed contents of the pan onto the conveyor, and varying the interval between the discharging steps of successive cycles directly with the weight of material to be discharged at the end of the interval.

5. A method of feeding carding material to a carding machine comprising moving a conveyor at a predetermined speed to convey carding material to the carding machine, cyclically feeding carding material to a scale pan, terminating the feeding of the material to the pan when an approximate predetermined weight of material has been introduced into the pan, discharging the weighed contents of the pan onto the conveyor, and varying the interval between the discharging steps of successive cycles directly with the weight of material to be discharged at the end of the interval, during each cycle moving the material deposited on the conveyor forwardly to unite it with previously deposited material, and varying the interval between the moving step of successive cycles to correspond to the interval between said discharging steps.

6. A feeder for a carding machine comprising a conveyor, means for operating the conveyor at a predetermined speed for conveying material to the carding machine, a weighing scale pan, means for feeding material to the scale pan, means actuated by the scale pan for producing a first effect of measurable magnitude proportional to the weight of material in the scale pan said means maintaining said effect as long as the material is in the pan, means actuated at a speed proportional to the speed of the conveyor for producing a second effect similar to the first effect of measurable magnitude, control means operable upon the magnitude of the second effect becoming equal to the magnitude of the first effect and discharge means on the scale pan actuated by the control means for discharging material weighed on the scale pan, from the scale pan onto the conveyor.

References Cited in the file of this patent

UNITED STATES PATENTS

| Number | Name | Date |
|---|---|---|
| 1,434,058 | Howe | Oct. 31, 1922 |
| 1,472,815 | Schimek | Nov. 6, 1923 |
| 1,798,776 | Allen | Mar. 31, 1931 |
| 2,221,396 | Evoy | Nov. 12, 1940 |
| 2,418,995 | Thomas et al. | Apr. 15, 1947 |
| 2,466,386 | Curioni | Apr. 5, 1949 |